United States Patent
Davis et al.

(10) Patent No.: US 11,045,378 B2
(45) Date of Patent: Jun. 29, 2021

(54) METHOD AND APPARATUS FOR MAKING FABRIC CASKET COMPONENTS

(71) Applicant: Vandor Corporation, Richmond, IN (US)

(72) Inventors: Justin F. Davis, Richmond, IN (US); Gerald H. Davis, Fountain City, IN (US)

(73) Assignee: Vandor Corporation, Richmond, IN (US)

( * ) Notice: Subject to any disclaimer, the term of this patent is extended or adjusted under 35 U.S.C. 154(b) by 178 days.

(21) Appl. No.: 16/190,534

(22) Filed: Nov. 14, 2018

(65) Prior Publication Data
US 2020/0146918 A1    May 14, 2020

(51) Int. Cl.
*A61G 17/007*    (2006.01)
*A61G 17/04*    (2006.01)
*B32B 5/02*    (2006.01)

(52) U.S. Cl.
CPC ......... *A61G 17/007* (2013.01); *A61G 17/042* (2016.11); *B32B 5/022* (2013.01); *B32B 2266/00* (2013.01); *B32B 2601/00* (2013.01)

(58) Field of Classification Search
CPC .................................................... D05B 39/00
See application file for complete search history.

(56) References Cited

U.S. PATENT DOCUMENTS

| | | | | |
|---|---|---|---|---|
| 1,174,750 A | * | 3/1916 | Mayo | D05B 39/00 112/470.09 |
| 1,251,677 A | * | 1/1918 | McDonald | D05B 39/00 112/470.09 |
| 1,403,094 A | * | 1/1922 | Murchison | D05B 21/00 112/470.09 |
| 3,034,458 A | * | 5/1962 | Bennison | D05B 39/00 112/470.09 |
| 3,367,295 A | * | 2/1968 | Piccinini | D05B 39/00 112/146 |
| 3,401,656 A | * | 9/1968 | Notz | D05B 23/00 112/470.09 |
| 3,405,670 A | * | 10/1968 | Scholl | D05B 39/00 112/470.09 |
| 3,443,537 A | * | 5/1969 | Karl | D05B 23/00 112/103 |

(Continued)

*Primary Examiner* — Jason L Vaughan
(74) *Attorney, Agent, or Firm* — Maginot, Moore & Beck, LLP

(57) ABSTRACT

A method of making a fabric component includes arranging panels of fabric on a frame such that a first panel is in direct contact with the frame and a second panel is positioned on a side of the first panel opposite the frame. The method includes arranging the panels on the frame to cover an opening of the frame and a clamping surface of the frame that surrounds a perimeter of the opening. The method includes rotating a clamp about an axis from an open position to a closed position to hold the panels directly interposed between the clamp and the clamping surface. The method includes arranging the opening in an operating area of a programmable sewing machine, and operating the sewing machine to sew the panels together within the opening such that the panels form the fabric component. The method includes removing the fabric component from the frame.

19 Claims, 15 Drawing Sheets

(56) References Cited

U.S. PATENT DOCUMENTS

| | | | | |
|---|---|---|---|---|
| 3,568,897 | A * | 3/1971 | McFalls | D05B 39/00 |
| | | | | 223/2 |
| 4,467,735 | A * | 8/1984 | Sadeh | D05B 39/00 |
| | | | | 112/470.14 |
| 4,635,574 | A * | 1/1987 | Fujita | D05B 25/00 |
| | | | | 112/155 |
| 5,156,104 | A * | 10/1992 | Wada | D05B 39/00 |
| | | | | 112/135 |
| 5,218,915 | A * | 6/1993 | Iwasaki | D05B 39/00 |
| | | | | 112/114 |
| 5,421,277 | A * | 6/1995 | Conley, Jr. | D05B 39/00 |
| | | | | 112/102.5 |
| 5,584,258 | A * | 12/1996 | del Castillo | D05B 21/00 |
| | | | | 112/114 |
| 2014/0251193 | A1 * | 9/2014 | Resta | D05B 39/00 |
| | | | | 112/475.08 |

* cited by examiner

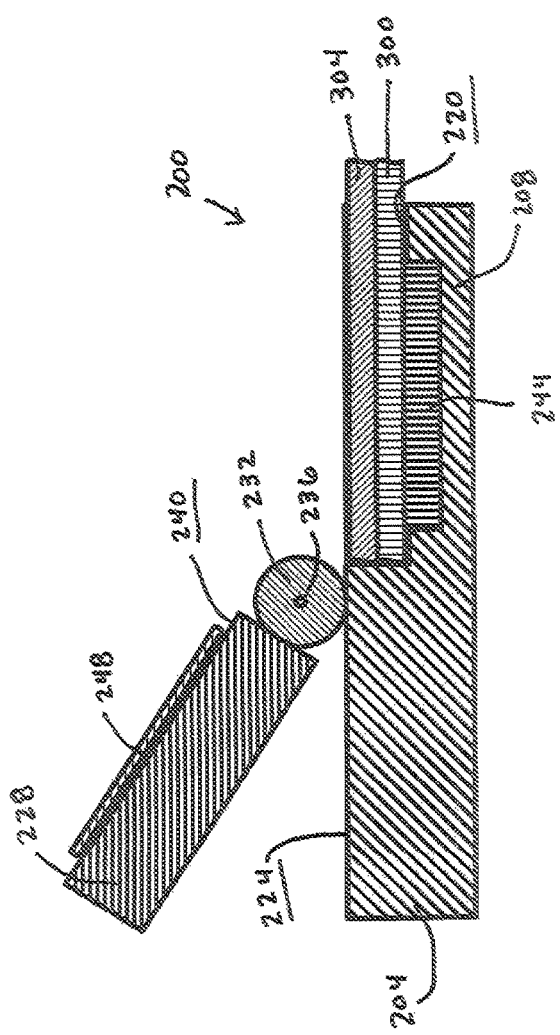
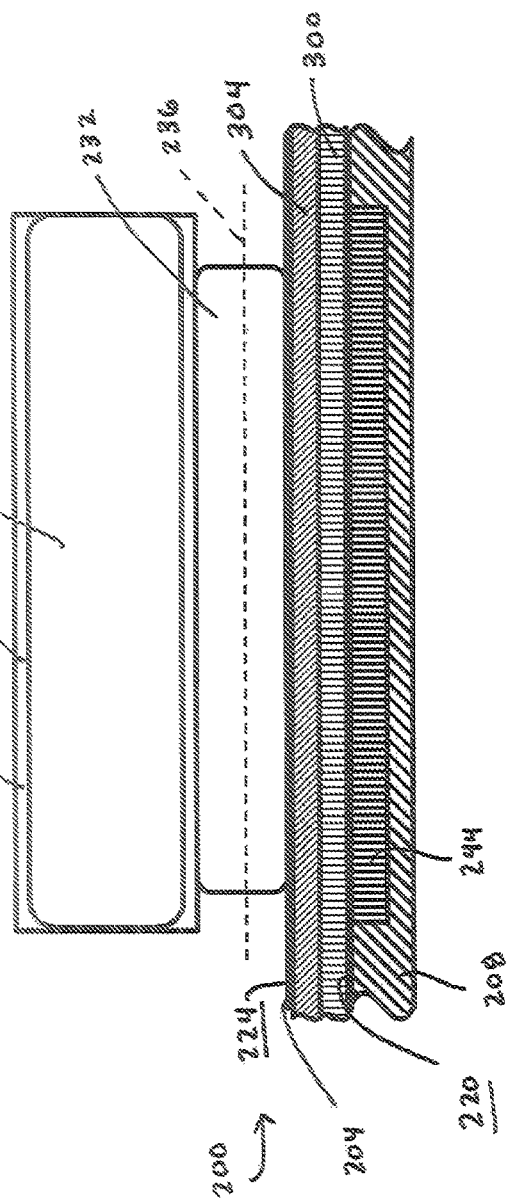
FIG. 9a
FIG. 9b

METHOD AND APPARATUS FOR MAKING FABRIC CASKET COMPONENTS

FIELD OF THE INVENTION

This invention relates to fabric components for use in caskets, and more specifically to a method and apparatus for use in making fabric components for use in caskets.

BACKGROUND

It is desirable for fabric components for use in caskets to have a tidy and comfortable appearance so that the deceased arranged in the casket have a dignified appearance and appear to be resting peacefully. Accordingly, it is desirable for fabric casket components to appear soft and tidy while functionally covering hardware and hard surfaces and edges of the casket. However, because fabric casket components do not need to actually be comfortable or functional as bed linens, it is also desirable for these components to be made in a manner that reduces costs.

As shown, for example, in FIG. 1, caskets 10 have a lid 14 which is often opened to enable viewing of the deceased, for example during funeral or memorial services or ceremonies. During such times, interior portions of the casket 10, including interior surfaces, interior edges, and interior hardware elements of the casket, are also visible. Fabric casket components, such as pillowcases 18, overlays 22, throws 26, and head panels 30 are used to cover at least some of these surfaces, edges, and elements to provide the casket 10 with the soft and comfortable appearance.

The pillowcase 18 is used in a conventional manner to cover the pillow on which the deceased is arranged within the casket 10. The overlay 22 is used to cover top edges and portions of the interiors and exteriors of the side walls of the casket 10, which are exposed when the casket lid 14 is opened. Accordingly, portions of the overlay 22 may extend into the casket adjacent to the pillow.

In some caskets, such as the casket 10 shown in FIG. 1, the casket lid 14 is divided into a head portion 15 and a foot portion 16, and only the head portion 15 of the casket lid 14 is opened for ceremonies or services. In such instances, a throw 26 is laid over some of the closed foot portion 16 of the casket lid 14 and hangs downwardly from the foot portion 16 into the casket 10 to provide a modesty covering for the portion of the deceased arranged beneath the closed foot portion 16 of the casket lid 14. Accordingly, the throw 26 also covers the middle edges of the foot portion 16 of the casket lid 14, which are exposed when the head portion 15 is opened.

In some caskets, the interior side of the casket lid 14 may include a fabric or fabric-covered head panel 30 that is visible when the openable portion(s) of the casket lid 14 is/are opened. Such a head panel 30 can be decorated with imagery that is meaningful to the deceased and/or the loved ones of the deceased. The head panel 30 can also include a skirt 34 that hangs downwardly from the casket lid 14 into the casket 10 to cover the hinge hardware that enables the casket lid 14 to be opened and closed.

Together, these components can completely cover the edges, surfaces, and hardware of a casket interior, providing the appearance of comfortable surfaces surrounding the deceased. It is desirable for each of these components to give the interior of the casket a tidy, respectful, and comfortable appearance, which can include being fitted, uniform, soft, smooth, and clean.

Typically, fabric casket components comprise multiple layers of material to enable the functionality of the components as well as provide the desired appearance. For example, as shown in FIG. 2, a thin, inexpensive backing layer 50 may be used as a base layer that is arranged facing the surfaces and edges of the casket. Additionally, a padding layer 54, made of a material such as, for example, a foam pad, may be used to provide padding and thickness to the fabric component, which is important to provide the appearance of comfort. A blackout layer 58 made of a blackout material may be provided to ensure the opaqueness of the fabric component and to adequately cover the other layers of the component. Additionally, a decorative layer 62 may be used as an outermost layer that will be arranged facing the deceased and/or facing away from the surfaces and edges of the casket. This decorative layer 62 will be the most aesthetically important layer, providing the visible surface of the fabric component.

Each of these layers serves a different function within the fabric component, and is thus made of a different material having different material properties such as a different thickness, stretch, softness, smoothness, and thread count. These differences make sewing the layers of the component together a challenge. For example, a layer of fabric made of a material having more stretch may creep or shift along an adjacent layer in an undesired manner as the two layers are sewn together. Additionally, a layer that is rougher, thicker, or less soft, may catch on an adjacent layer and pull or shift it in an undesired manner as the two layers are sewn together.

Accordingly, fabric casket components are typically sewn by hand to enable the seamstress or sewer to adjust and reposition the layers of fabric as needed as the layers are being sewn together. Hand-sewing is time consuming and labor intensive, adding to the costs of the components. Additionally, human labor introduces errors into the product, which may result in wasted materials, further increasing the costs of the components.

It is desirable to provide a method for making inexpensive fabric casket components that provide a comfortable and tidy looking casket interior. It is further desirable to provide an apparatus that enables making inexpensive fabric casket components that provide a comfortable and tidy looking casket interior.

SUMMARY

One or more of the embodiments of the present disclosure provides a method of making a fabric component for use with a casket. The method includes arranging at least two panels of fabric on a frame such that one of the panels forms a first panel that is in direct contact with the frame and another one of the panels forms a second panel that is positioned on a side of the first panel that is opposite to the frame. The panels of fabric are arranged such that the first panel and the second panel cover an opening of the frame and cover a clamping surface of the frame that surrounds a perimeter of the opening. The method further includes rotating at least one clamp about an axis of rotation that is positionally fixed relative to the frame. The at least one clamp is rotated from an open position to a closed position to hold the first panel and the second panel directly interposed between the at least one clamp and the clamping surface. The method further includes arranging the opening of the frame in an operating area of a programmable sewing machine. The method further includes operating the programmable sewing machine to sew the at least two panels of fabric together within the opening of the frame such that the at least two panels of fabric form the fabric component. The method further includes removing the fabric component from the frame.

At least one embodiment of the present disclosure provides a method of making a fabric component for use with a casket. The method includes operating selectively with a controller a programmable sewing machine to: (a) move a frame relative to a sewing needle such that at least two panels of fabric covering an opening of the frame are arranged in an operating area of the sewing needle; and (b) guide the sewing needle in the operating area through the at least two panels of fabric to form the fabric component. In the method, a first panel of the at least two panels is arranged in direct contact with the frame and a second panel of the at least two panels is arranged on a side of the first panel opposite to the frame, and the first panel and the second panel cover a clamping surface of the frame surrounding a perimeter of the opening. In the method, at least one clamp rotates about an axis of rotation that is positionally fixed relative to the frame from an open position to a closed position to hold the at least two panels of fabric directly interposed between the at least one clamp and the clamping surface while the programmable sewing machine guides the sewing needle through the at least two panels of fabric.

BRIEF DESCRIPTION OF THE DRAWINGS

FIG. 9a depicts a schematic drawing of a partial cross-section of the frame of FIG. 8.

FIG. 9b depicts a schematic drawing of another partial cross-section of the frame of FIG. 8.

DETAILED DESCRIPTION

Figure 1:
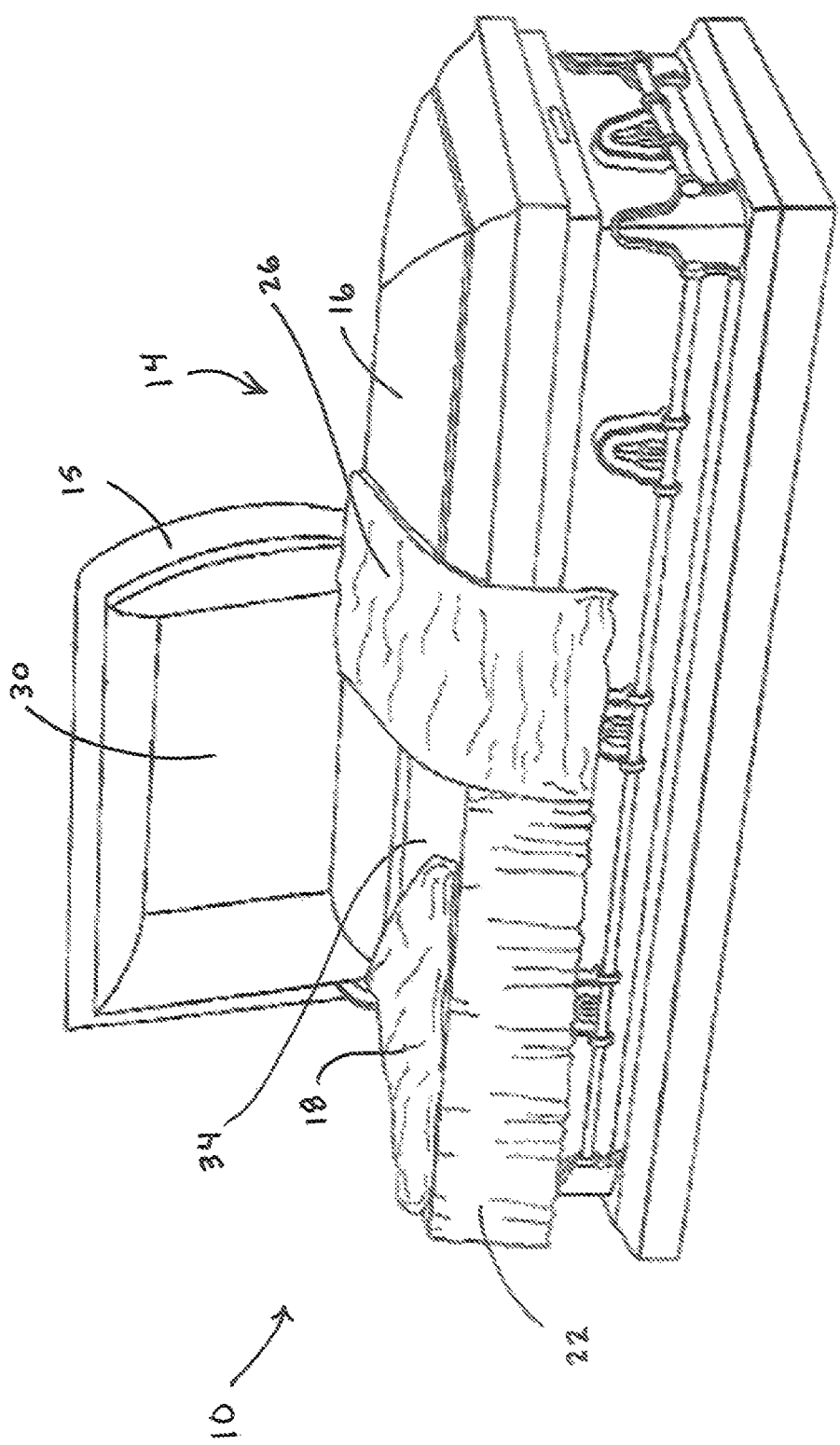
FIG. 1 depicts a known arrangement of fabric components, including a pillowcase, an overlay, a throw, and a head panel, in a casket.
Figure 3:
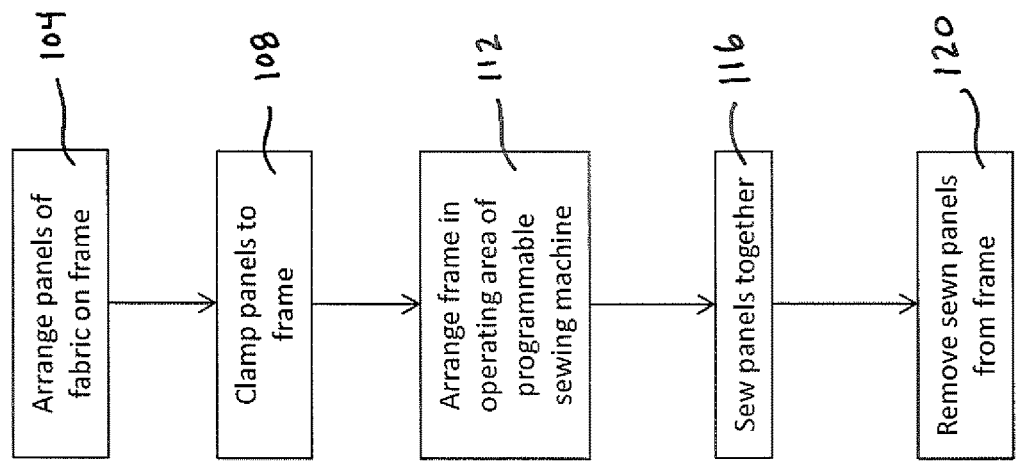
FIG. 3 depicts a flow chart of a method of making the fabric components shown in FIG. 1.

FIG. 3 depicts a flow chart of a method 100 of making the fabric components shown in FIG. 1. As described in further detail below, the method 100 includes arranging at least two panels of fabric on a frame (block 104). The method 100 further includes clamping the panels of fabric to the frame (block 108). The method 100 further includes arranging the frame in an operating area of a programmable sewing machine (block 112). The method 100 further includes operating the programmable sewing machine to sew the panels of fabric together (block 116). The method 100 further includes removing the sewn panels from the frame (block 120).

Figure 4:
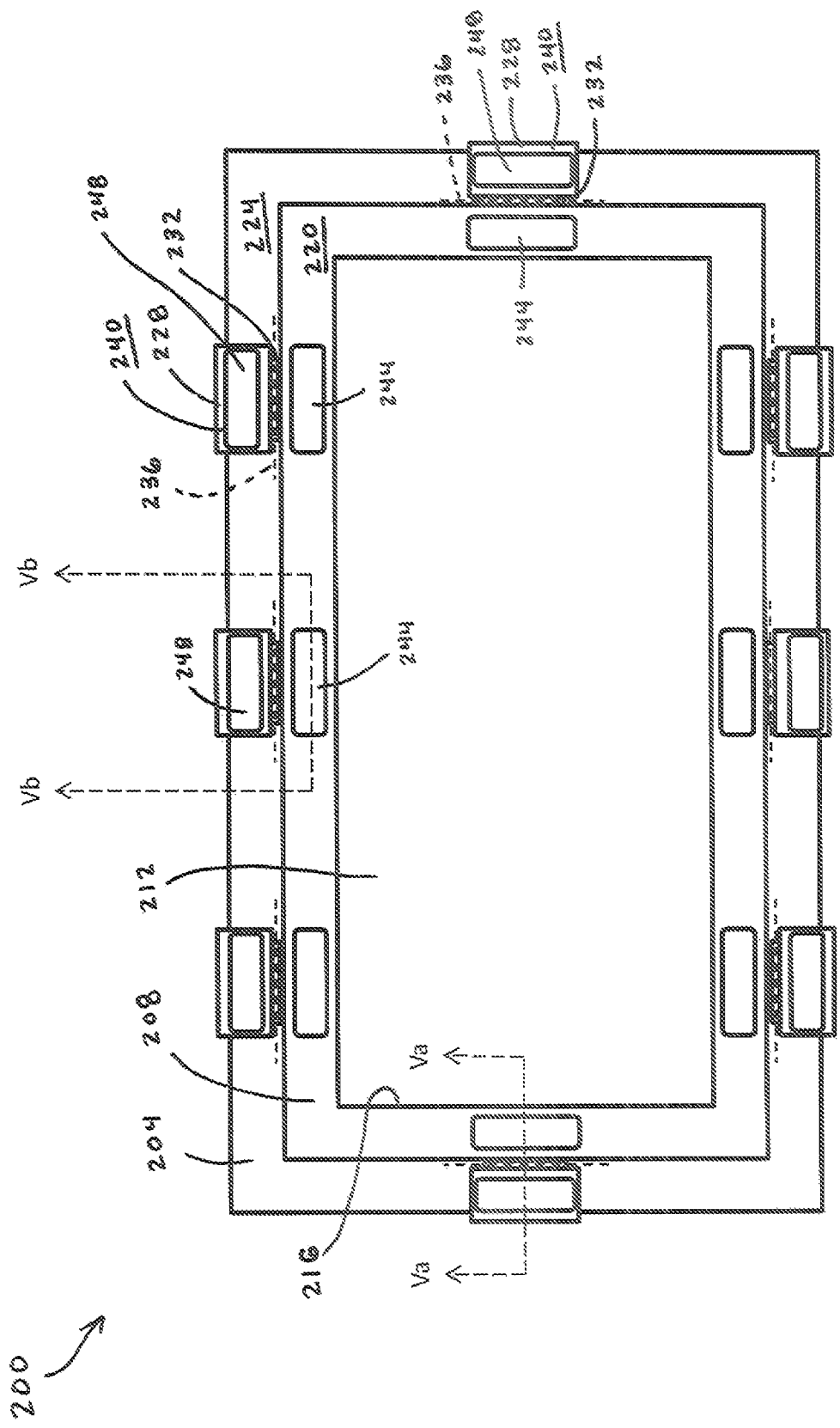
FIG. 4 depicts a frame for use in making the fabric components shown in FIG. 1 including a plurality of clamps in an open position.

FIG. 4 depicts a frame 200 for use in the method 100 of making the fabric components shown in FIG. 1 (discussed above). The frame 200 includes a lip 204, a recessed ledge 208 formed in the inward facing edge of the lip 204, and an opening 212 formed inwardly of the recessed ledge 208. The recessed ledge 208 and the lip 204 of the frame 200 are formed as closed polygons. Thus, the recessed ledge 208 is enclosed within the lip 204, and the opening 212 is enclosed within the recessed ledge 208. As such, the opening 212 has a perimeter 216 that is defined by the recessed ledge 208.

The opening 212, the recessed ledge 208, and the lip 204 of the frame 200 are arranged concentrically, meaning they are arranged having a common center. Furthermore, the recessed ledge 208 of the frame 200 is arranged concentrically between the opening 212 and the lip 204 of the frame 200. In the embodiment shown, the opening 212, the recessed ledge 208, and the lip 204 have the same rectangular shape with different dimensions. In alternative embodiments, the opening 212, recessed ledge 208, and lip 204 need not have the same shape or be rectangular, but are still arranged such that the recessed ledge 208 is between the opening 212 and the lip 204.

Figure 5:
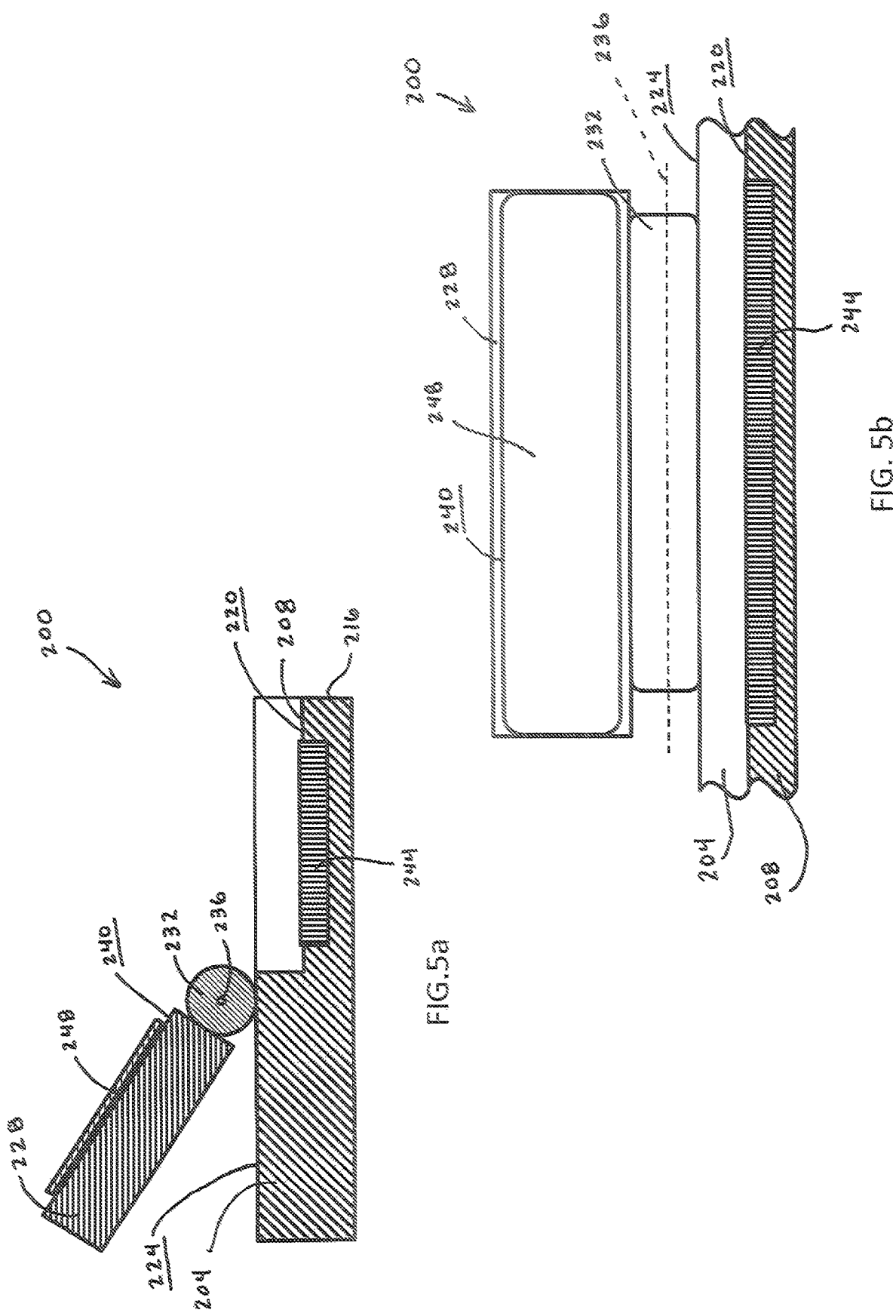
FIG. 5a depicts a schematic drawing of a partial cross-section of the frame of FIG. 4.
FIG. 5b depicts a schematic drawing of another partial cross-section of the frame of FIG. 4.

As shown in FIG. 5a, which depicts a schematic drawing of a partial cross-section of the frame 200 cut along lines Va-Va of FIG. 4, the recessed ledge 208 is formed as a rabbet. Accordingly, the recessed ledge 208 is a recess or groove cut into the inwardly facing edge of the lip 204 of the frame 200. Thus, the recessed ledge 208 is two sided and is open in inwardly and upwardly facing directions of the frame 200.

The frame 200 further includes a clamping surface 220 that is formed on the recessed ledge 208. In the embodiment shown, the clamping surface 220 is coincident and coextensive with the recessed ledge 208. In other words, in the embodiment shown, the clamping surface 220 is the upwardly facing surface of the recessed ledge 208. However, in other embodiments, the clamping surface 220 can be a portion or portions of the upwardly facing surface of the recessed ledge 208.

As shown in FIG. 5a and in FIG. 5b, which depicts a schematic drawing of another partial cross-section of the frame 200 cut along lines Vb-Vb, the lip 204 of the frame 200 extends above the recessed ledge 208, and defines a lip surface 224 that is the upwardmost surface of the frame 200. The lip surface 224 and the clamping surface 220 are parallel to one another, but are not coplanar with one another. In other words, the plane in which the lip surface 224 lies is parallel to the plane in which the clamping surface 220 lies, but the lip surface 224 and the clamping surface 220 do not lie in the same plane. As described in more detail below, the difference in height between the clamping surface 220 and the lip surface 224 provides a recess configured to receive the panels of fabric for clamping to the frame 200.

The frame 200 further includes at least one clamp 228 for clamping the panels of fabric to the frame 200. Each clamp 228 is rotatably coupled to the lip surface 224 via, for example, a hinge 232, which is positionally fixed relative to the frame 200. Each hinge 232 is configured to enable the clamp 228 to rotate between an open position (shown in FIGS. 4, 5a, and 5b), in which the clamp 228 is arranged above the lip surface 224, and a closed position (shown in FIGS. 10, 11a, and 11b), in which the clamp 228 is arranged above the clamping surface 220. Thus, the hinge 232 defines an axis of rotation 236 about which the clamp 228 is configured to rotate between the open position and the closed position. The axis of rotation 236 of the hinge 232 is positionally fixed relative to the frame 200 and is parallel to the lip surface 224.

As described in more detail below, rotating each clamp 228 about its respective hinge 232 from the open position to the closed position enables the frame 200 to hold panels of fabric between the clamp 228 and the clamping surface 220. As such, in the embodiment shown, the frame 200 includes eight clamps 228, but alternative embodiments may include more or fewer than eight clamps 228. The number of clamps 228 is any number which is sufficient to clamp the panels of fabric to the frame 200 by holding the panels of fabric firmly between the clamps 228 and the clamping surface 220.

As noted above, when the clamp 228 is in the open position, the clamp 228 is arranged above the lip surface 224. More specifically, as shown in FIG. 4, in which the frame 200 is viewed from above, in the open position, the clamp 228 is not arranged above any portion of the recessed ledge 208 or the clamping surface 220. Accordingly, the clamp 228 does not obscure any portion of the recessed ledge 208 or clamping surface 220 in the top plan view shown in FIG. 4. Thus, in the open position, the clamp 228 is not arranged to hold panels of fabric between the clamp 228 and the clamping surface 220.

Figure 10:
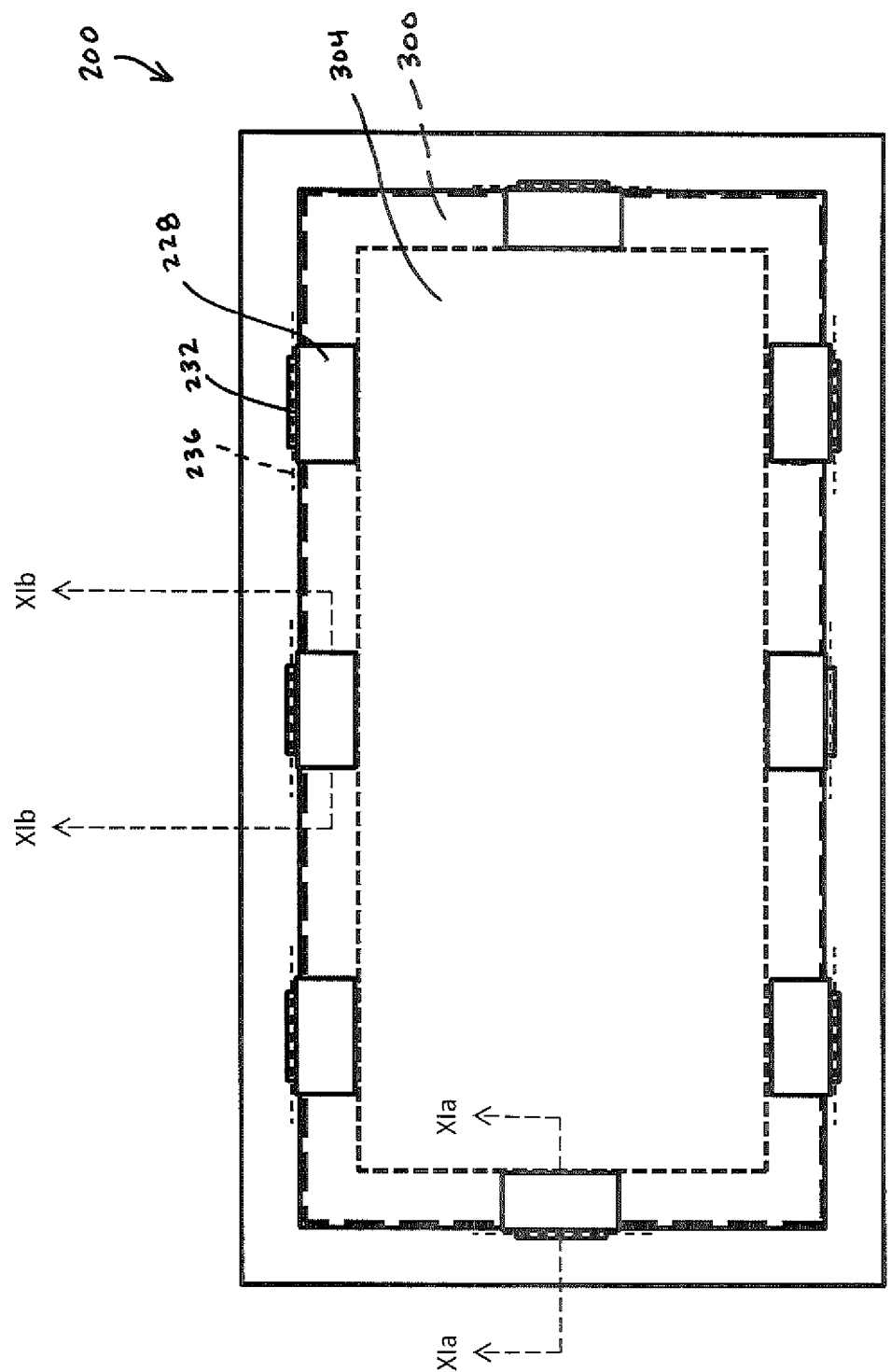
FIG. 10 depicts the frame and layers of fabric of FIG. 9 with the clamps in a closed position.

In contrast, when the clamp 228 is in the closed position, the clamp 228 is arranged above the clamping surface 220. More specifically, as shown in FIG. 10, in which the frame 200 is viewed from above, in the closed position, the clamp 228 is arranged above the recessed ledge 208 and the clamping surface 220. Accordingly, the clamp 228 obscures the recessed ledge 208 or clamping surface 220 in the top plan view shown in FIG. 10. Thus, in the closed position, the clamp 228 is arranged to hold the panels of fabric between the clamp 228 and the clamping surface 220 of the recessed ledge 208.

Figure 11A:
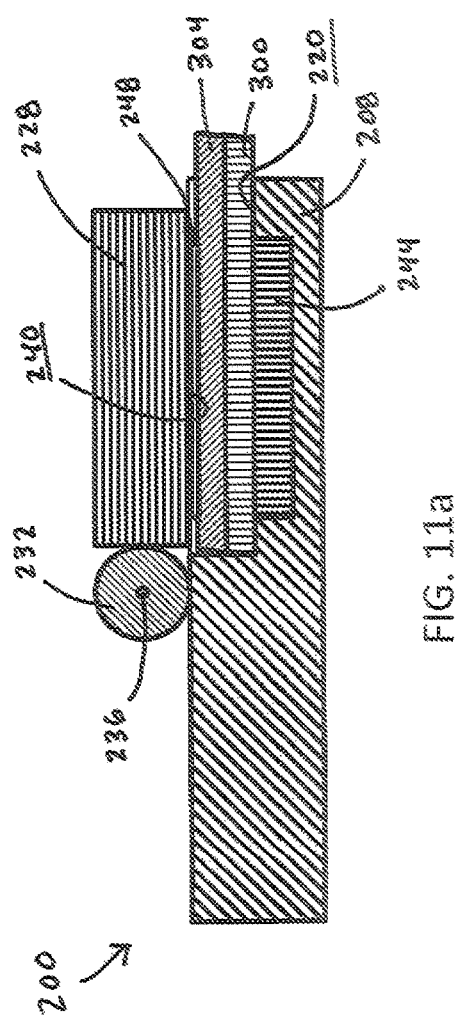
FIG. 11a depicts a schematic drawing of a partial cross-section of the frame of FIG. 10.
Figure 11B:
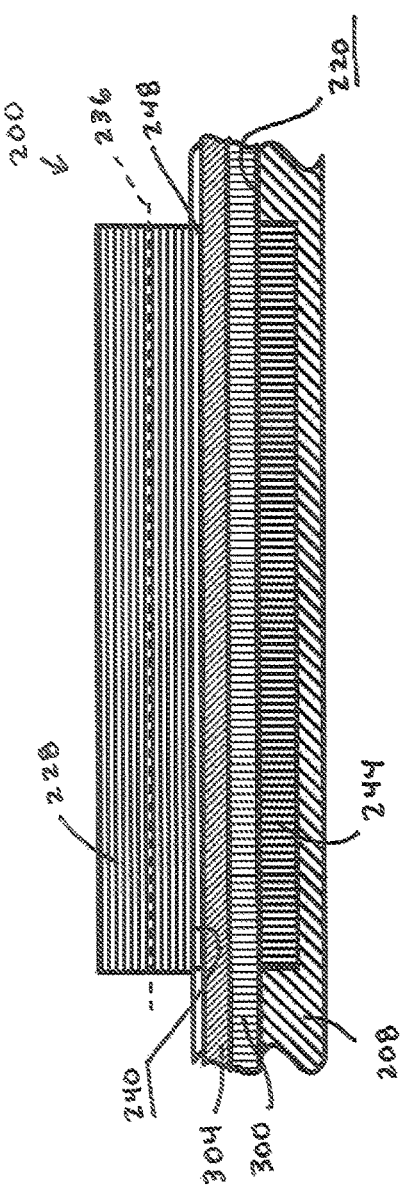
FIG. 11b depicts a schematic drawing of another partial cross-section of the frame of FIG. 10.

To further clarify the open and closed positions of the clamp 228, FIGS. 4, 5a, and 5b show that each clamp 228 defines a retaining surface 240, which as described in more detail below, is configured to be in contact with the panels of fabric when the clamp 228 is in the closed position. As shown in FIGS. 11a and 11b, when the clamp 228 is in the closed position, the retaining surface 240 is arranged parallel to and facing toward the clamping surface 220. In contrast, as shown in FIGS. 5a and 5b, when the clamp 228 is in the open position, the retaining surface 240 is not arranged parallel to the clamping surface 220, and the retaining surface 240 is not facing toward the clamping surface 220. It is noted that in some embodiments, it may be possible for the clamp 228 to rotate a full 180 degrees between the open position and the closed position. In this case, in the open position, the retaining surface 240 will be parallel to the clamping surface 220, but will not be facing toward the clamping surface 220. In either case, in the closed position, the retaining surface 240 is directly opposite to and directly facing toward the clamping surface 220, and in the closed position, the retaining surface 240 is not directly opposite to and is not directly facing toward the clamping surface 220.

To facilitate holding the panels of fabric between the clamp 228 and the clamping surface 220, the frame 200 further includes at least one metal plate 244 and at least one corresponding magnet 248. Each metal plate 244 is arranged on or in the clamping surface 220 of the frame 200. In at least one embodiment, each metal plate 244 is applied to the clamping surface 220 of the frame 200 such that the metal plate 244 is entirely positioned on the clamping surface 220 of the recessed ledge 208. In at least one alternative embodiment, each metal plate 244 is partially received within the recessed ledge 208 such that the metal plate 244 extends upwardly out of the clamping surface 220. In at least one further alternative embodiment, each metal plate 244 is received within the recessed ledge 208 so as to be flush with the clamping surface 220. In any case, each of the metal plates 244 is configured and arranged to cooperate with a corresponding magnet 248, which is similarly arranged on, partially received within, or received within the retaining surface 240 of a corresponding clamp 228.

When each clamp 228 is in the closed position, the magnet 248 is attracted to the corresponding metal plate 244 such that anything positioned between the magnet 248 and the metal plate 244 is held in place by attractive forces pulling the magnet 248 toward the metal plate 244 and thus pulling the retaining surface 240 toward the clamping surface 220. It should be appreciated that, in an alternative embodiment, it is possible to arrange the magnet 248 on or within the clamping surface 220 instead of the retaining surface 240 and to arrange the metal plate 144 on or within the retaining surface 240 instead of the clamping surface 220.

In the embodiment shown, the frame 200 includes eight metal plates 244, each of which corresponds to one magnet 248 arranged in or on each of the eight clamps 228. In other words, the frame 200 includes metal plates 244 in a one to one ratio with magnets 248. In alternative embodiments, the frame 200 can include a higher or lower ratio of metal plates 244 to magnets 248. For example, the frame 200 can include more than one metal plate 244 corresponding to each magnet 248. Conversely, the frame 200 can include more than one magnet 248 corresponding to each metal plate 244. By way of example, in one embodiment, the frame 200 can include just one metal plate 244 that covers substantially the entirety of the clamping surface 220 and a plurality of magnets 248, one magnet 248 for each clamp 228.

Similarly, in the embodiment shown, the frame 200 includes magnets 248 in a one to one ratio with clamps 228. In alternative embodiments, the frame 200 can include a higher or lower ratio of magnets 248 to clamps 228. By way of example, the frame 200 can include more than one magnet 248 on or within each clamp 228 such that more than one magnet 248 corresponds to each metal plate 244.

In any case, the frame 200 includes at least one magnet 248 configured to cooperate with at least one metal plate 244 such that anything positioned between the magnet 248 and the metal plate 244 when the clamp 228 is in the closed position is held in place by attractive magnetic forces pulling the magnet 248 toward the metal plate 244.

Figure 6:
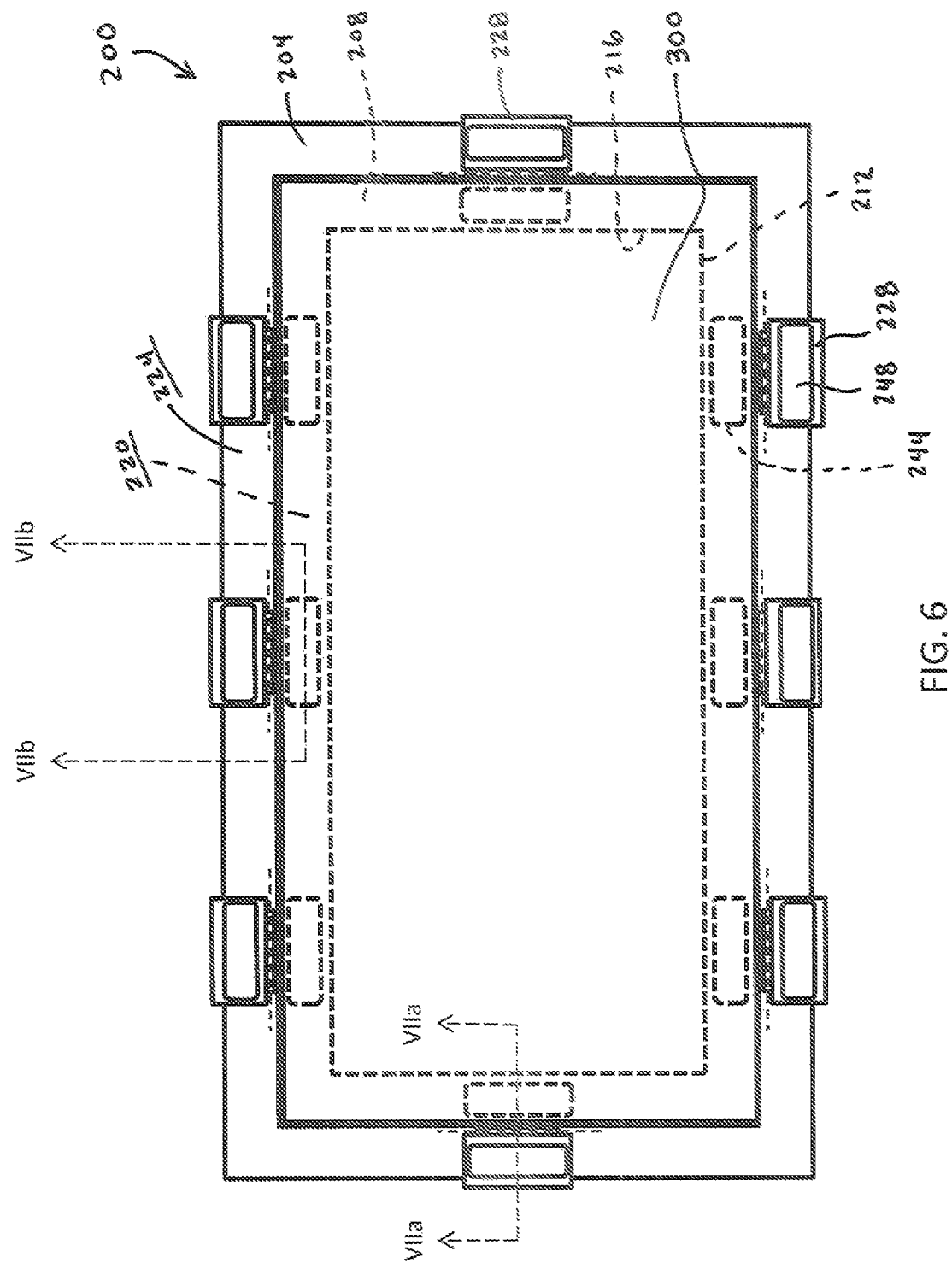
FIG. 6 depicts the frame of FIG. 4 and a layer of fabric arranged on the frame.
Figure 7:
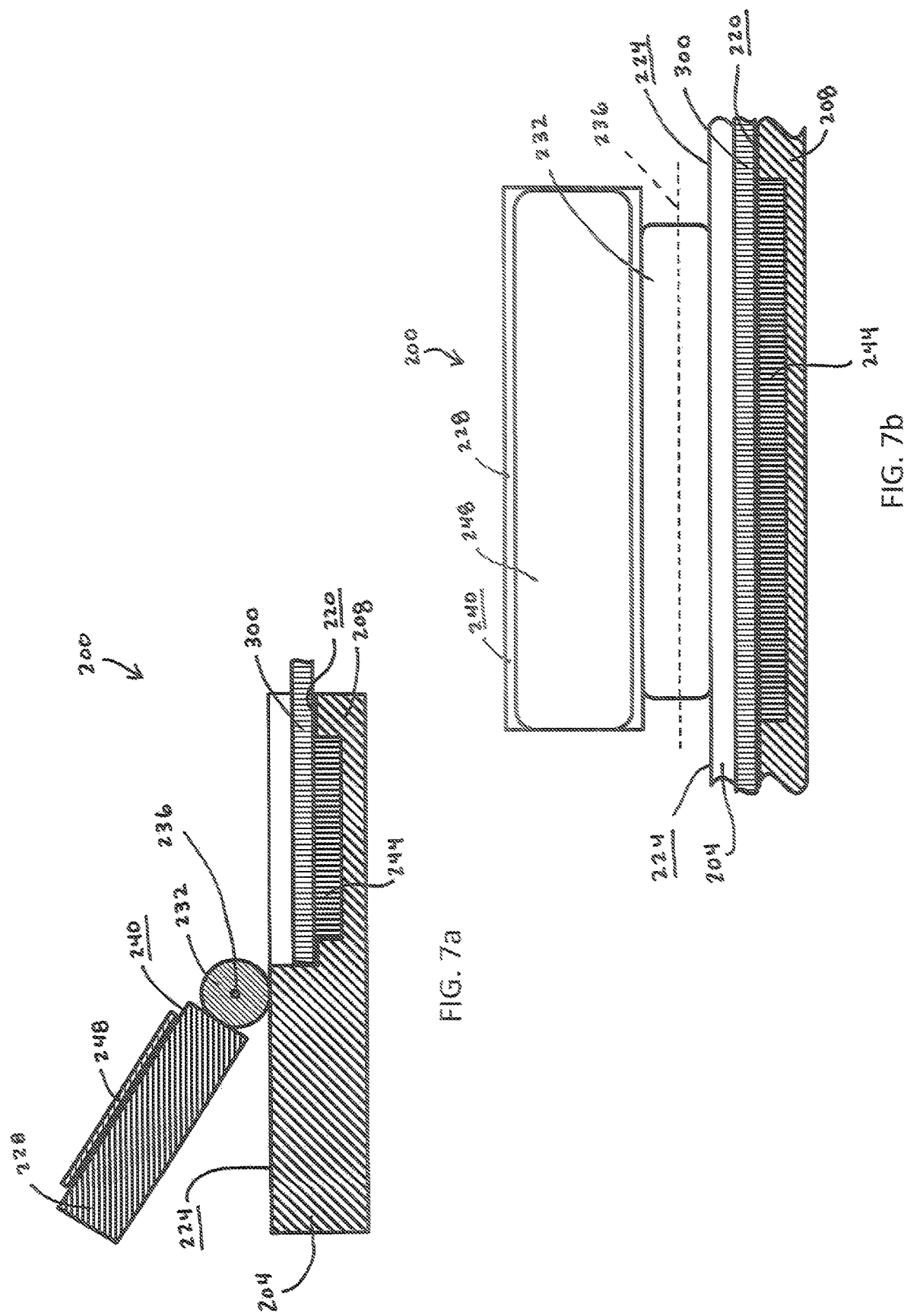
FIG. 7a depicts a schematic drawing of a partial cross-section of the frame of FIG. 6.
FIG. 7b depicts a schematic drawing of another partial cross-section of the frame of FIG. 6.

To make a fabric component, such as a pillowcase 18, overlay 22, throw 26, or head panel 30 for a casket 10 (shown in FIG. 1), the frame 200 is used in the method 100, described above, in the following manner. As shown in FIG. 6, a first panel of fabric 300 is arranged on the frame 200 (block 104 of method 100) to cover the opening 212 and the clamping surface 220. More specifically, as shown in FIGS. 7a and 7b, which depict schematic drawings of partial cross-sections of the frame 200 cut along lines VIIa-VIIa and VIIb-VIIb of FIG. 6 respectively, the first panel of fabric 300 is arranged in direct contact with the frame 200, and as shown in FIG. 7a, the first panel of fabric 300 is arranged within the recessed ledge 208. Accordingly, the first panel of fabric 300 is arranged on the clamping surface 220, but not the lip surface 224 of the frame 200. This arrangement helps to enable clamping the first panel of fabric 300 to the frame 200 and helps to retain the first panel of fabric 300 in the desired position on the frame 200 throughout the sewing process. The perimeter 216 of the opening 212, the recessed ledge 208, and the metal plates 244 are shown in dashed lines in FIG. 6 to indicate that they have been covered by the first panel of fabric 300. As shown, each of the clamps 228 is in the open position when the first panel of fabric 300 is arranged on the frame 200.

In the embodiment shown, the first panel of fabric 300 entirely covers the opening 212. In an alternative embodiment, however, the first panel of fabric 300 need not cover the entirety of the opening 212, as long as the first panel of fabric 300 is arranged such that it will be held in place on the frame 200 by the clamps 228. Similarly, in the embodiment shown, the first panel of fabric 300 entirely, or substantially entirely, covers the clamping surface 220 of the recessed ledge 208. In alternative embodiments, however, the first panel of fabric 300 need not cover the entirety of the clamping surface 220, or it may extend onto the lip surface 224, as long as the first panel of fabric 300 is arranged such that it will be held in place on the frame 200 by the clamps 228 and will not interfere with the functionality of the clamps 228.

Figure 8:
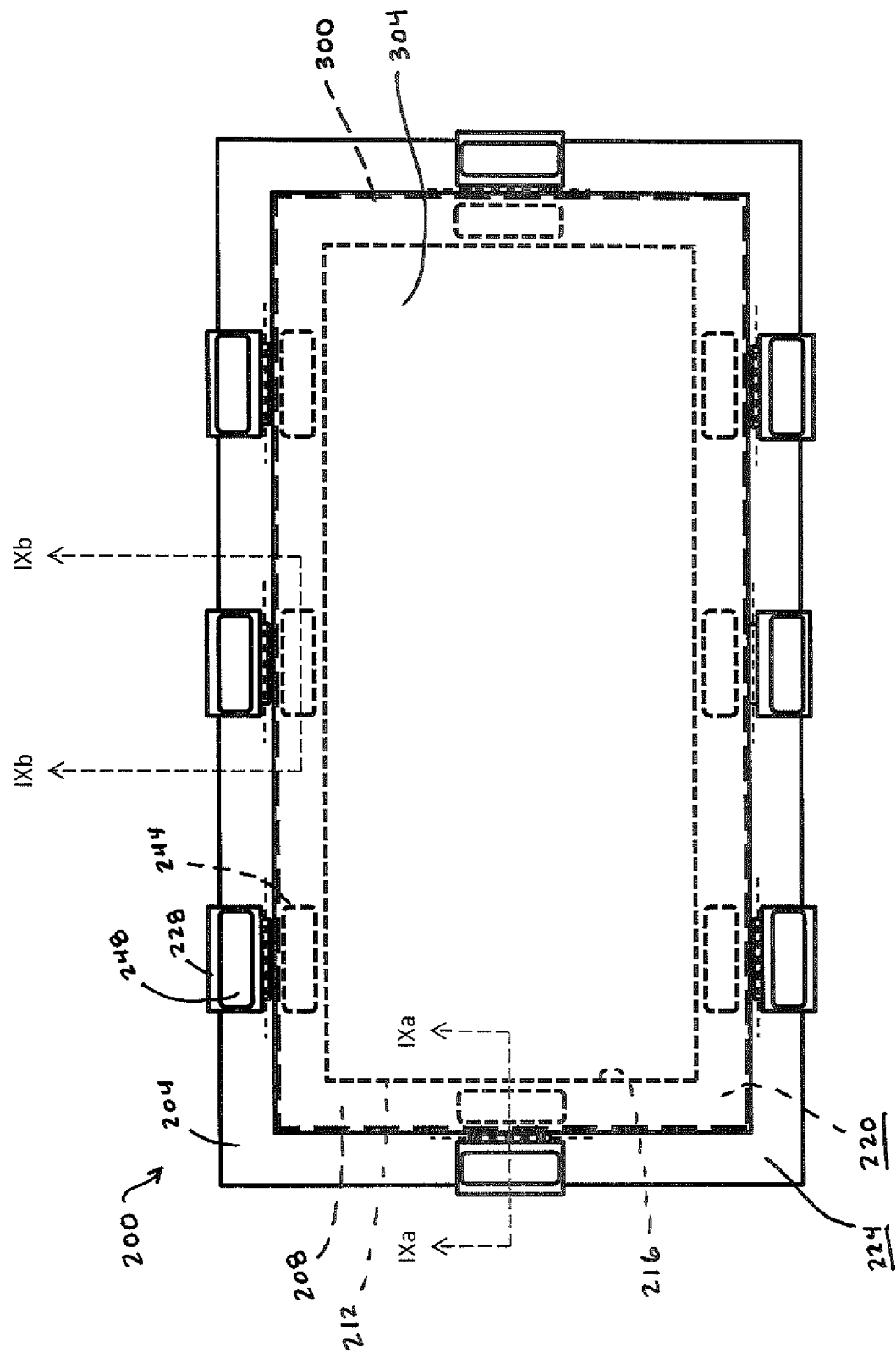
FIG. 8 depicts the frame and layer of fabric of FIG. 6 with another layer of fabric arranged on the frame.

Next, as shown in FIG. 8, a second panel of fabric 304 is arranged on the frame 200 (block 104 of method 100). More specifically, as shown in FIGS. 9a and 9b, which depict schematic drawings of partial cross-sections of the frame 200 cut along lines IXa-IXa and IXb-IXb, respectively, the second panel of fabric 304 is arranged directly on the first panel of fabric 300. In other words, the second panel of fabric 304 is not in direct contact with the clamping surface 220 of the frame 200, but is instead arranged on a side of the first panel of fabric 300 that is opposite to the clamping surface 220. The second panel of fabric 304 is separated from the clamping surface 220 by the first panel of fabric 300, and the first panel of fabric 300 is directly interposed between the clamping surface 220 and the second panel of fabric 304.

As shown in FIG. 9a, like the first panel of fabric 300, the second panel of fabric 304 is also arranged within the recessed ledge 208 such that the second panel of fabric 304 is arranged on the clamping surface 220, but not the lip surface 224. This arrangement helps to enable clamping the second panel of fabric 304 to the frame 200 and helps to retain the second panel of fabric 304 in the desired position on the frame 200 throughout the sewing process. The first panel of fabric 300 is shown in dashed lines in FIG. 8 to indicate that it has been covered by the second panel of fabric 304. As shown, each of the clamps 228 is still in the open position when the second panel of fabric 304 is arranged on the frame 200.

In the embodiment shown, the second panel of fabric 304 entirely covers the first panel of fabric 300, and thus also entirely covers the opening 212. In an alternative embodiment, however, the second panel of fabric 304 need not cover the entirety of the first panel of fabric 300 or the opening 212, as long as the second panel of fabric 304 is arranged such that it will be held in place on the frame 200 by the clamps 228. Furthermore, in the embodiment shown, the second panel of fabric 304 entirely, or substantially entirely, covers the clamping surface 220 of the recessed ledge 208. In alternative embodiments, however, the second panel of fabric 304 need not cover the entirety of the clamping surface 220, or it may extend onto the lip surface 224, as long as the first panel of fabric 304 is arranged such that it will be held in place on the frame 200 by the clamps 228 and will not interfere with the functionality of the clamps 228.

Next, as shown in FIG. 10, the first and second panels of fabric 300, 304 are clamped onto the frame 200 (block 108 of method 100). More specifically, each of the clamps 228 is rotated from the open position to the closed position about the axis of rotation 236 of the corresponding hinge 232. As shown in FIGS. 11a and 11b, which depict schematic drawings of partial cross-sections of the frame 200 cut along lines XIa-XIa and XIb-XIb, when the clamps 228 are in the closed position, the first and second panels of fabric 300, 304 are clamped between the magnet 248, which is affixed to the clamp 228, and the metal plate 244, which is affixed to the recessed ledge 208.

In the embodiment shown, the retaining surface 240 of the clamp 228 is not in direct contact with the panels of fabric 300, 304, because the magnet 248 is arranged so as to extend from the retaining surface 240 of the clamp 228. In embodiments wherein the magnet 248 is flush with the retaining surface 240 of the clamp 228, however, the retaining surface 240 of the clamp 228 is in direct contact with the second panel of fabric 304 when the clamp 228 is in the closed position. In either case, when each clamp 228 is in the closed position, the first and second panels of fabric 300, 304 are held directly interposed between the clamp 228 and the clamping surface 220.

Figure 12:
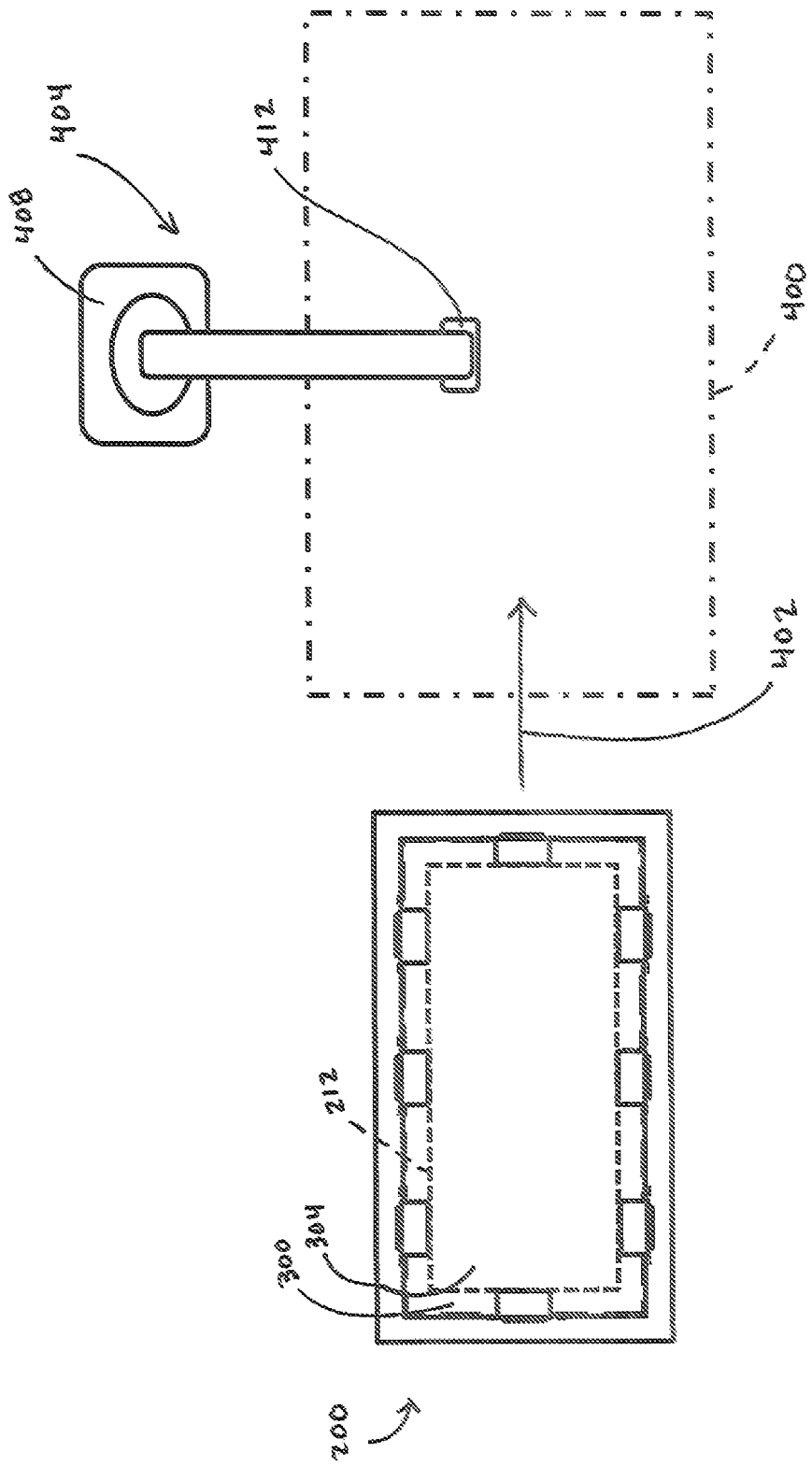
FIG. 12 depicts the frame and the layers of fabric of FIG. 10 and a programmable sewing machine.
Figure 13:
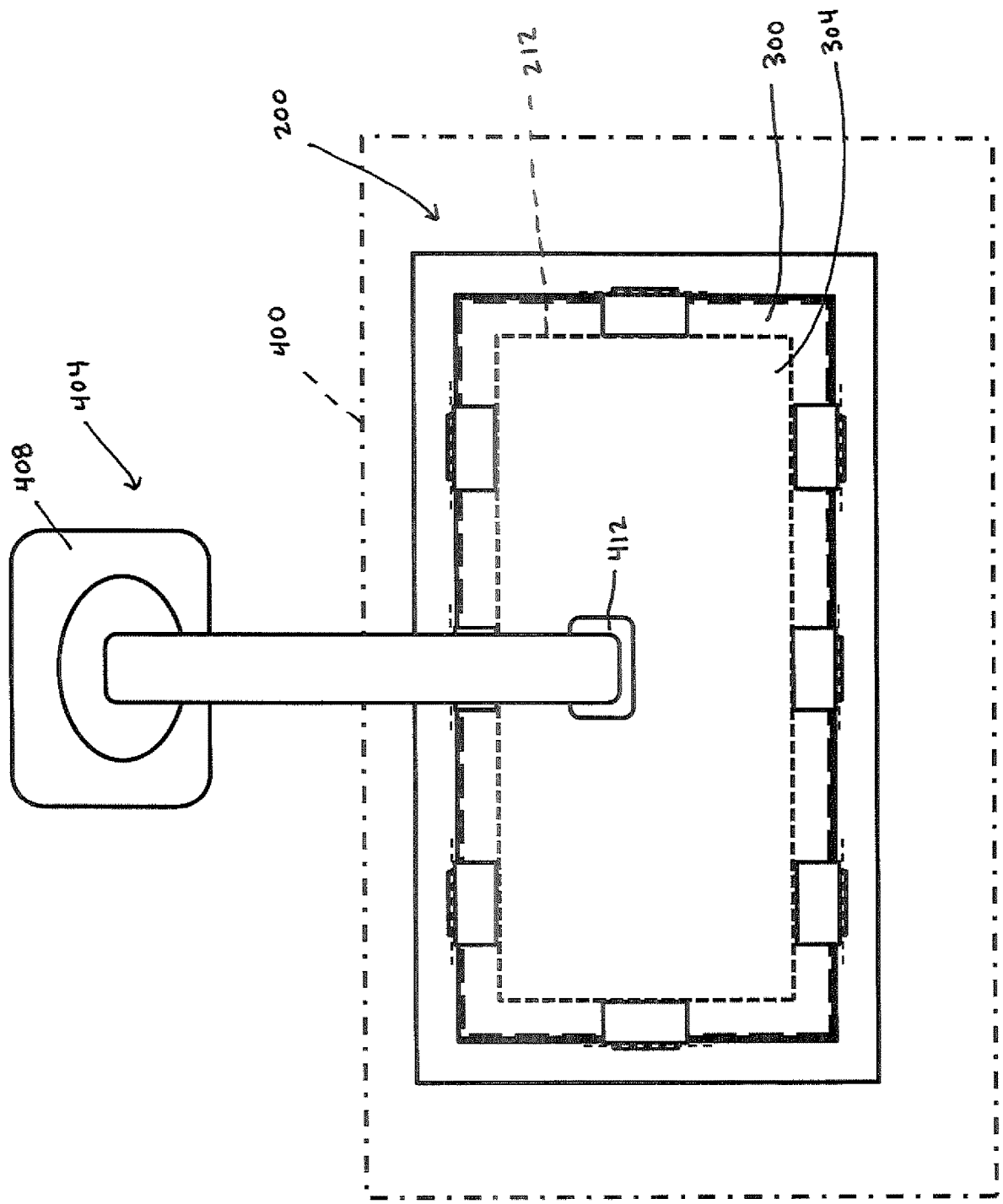
FIG. 13 depicts the frame and the layers of fabric of FIG. 10 positioned in an operating area of the programmable sewing machine.

Next, as shown in FIG. 12, the frame 200 is arranged in an operating area 400 of a programmable sewing machine 404 (block 112 of method 100). Accordingly, the opening 212 of the frame 200 is also arranged in the operating area 400. The arrow 402 in FIG. 12 indicates movement of the frame 200 from a position outside the operating area 400 to a position inside the operating area 400. The programmable sewing machine 404 is, for example, a computer numerical control (or "CNC") sewing machine. As such, the sewing machine 404 includes a controller 408 configured to selectively operate the sewing machine 404 to move the frame 200 within the operating area 400 to selectively position the opening 212 of the frame 200, and thus the panels of fabric 300, 304 covering the opening 212, in a series of pre-programmed positions. One such position is shown in FIG. 13. By way of example, the sewing machine 404 can include an arm (not shown) to which the frame 200 can be coupled. By operating the sewing machine 404 to move the arm, the controller 408 selectively moves the frame 200 relative to a sewing needle (not shown) held in a head 412 of the sewing machine 404.

Figure 14:
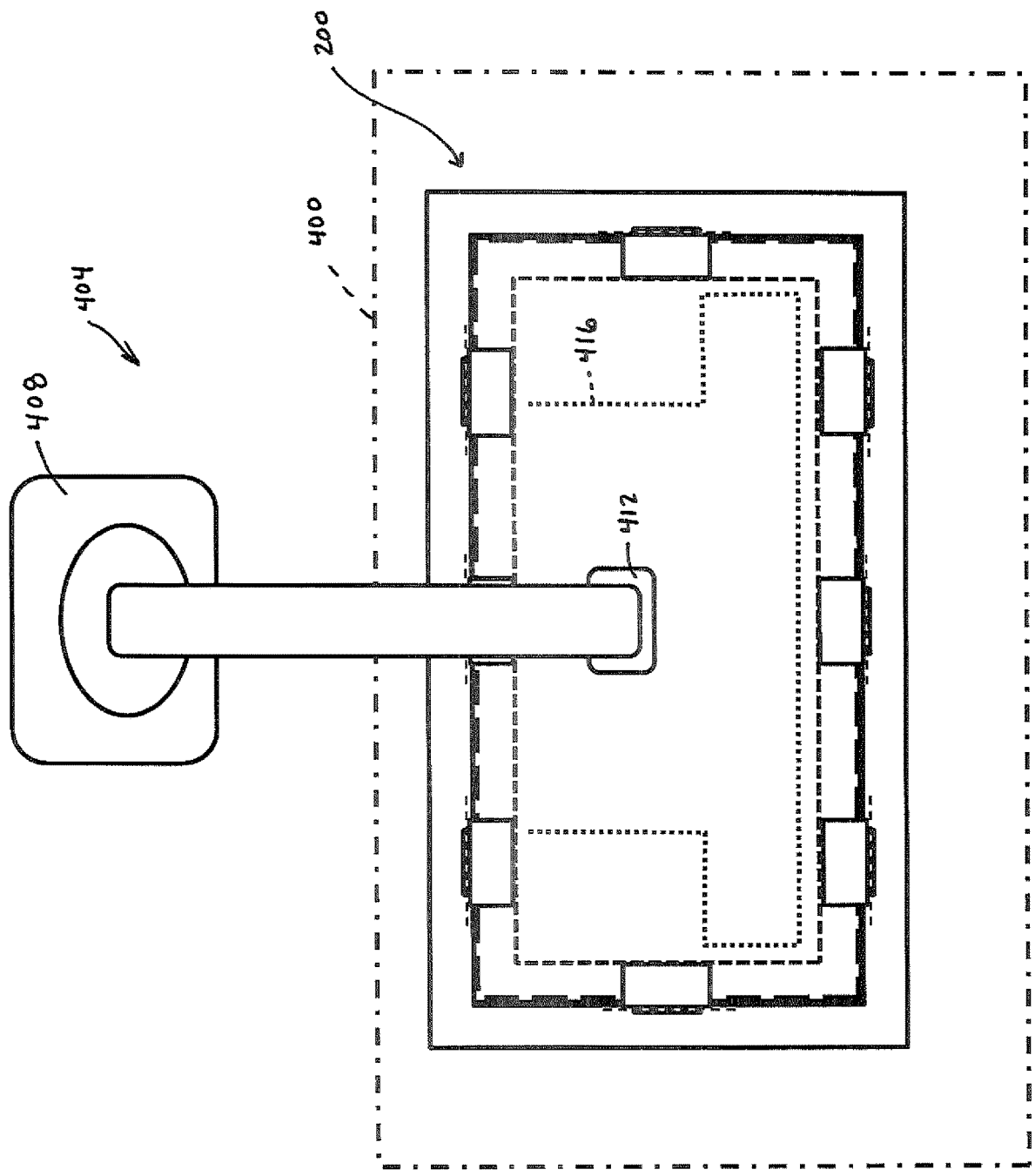
FIG. 14 depicts the frame and the layers of fabric of FIG. 10 after the layers of fabric have been sewn by the programmable sewing machine.

As shown in FIG. 14, the controller 408 is also configured to selectively operate the sewing machine 404 to guide the sewing needle to sew a pre-programmed pattern of stitches 416 within the operating area 400. Accordingly, the controller 408 is configured to selectively operate the sewing machine 404 to sew the stitches 416 through the first and second panels of fabric 300, 304, sewing the first and second panels 300, 304 together (block 116 of method 100), when the frame 200 is positioned in the series of pre-programmed positions. More explicitly, the controller 408 selectively operates the sewing machine 404 to sew the first panel of fabric 300 directly to the second panel of fabric 304 with the stitches 416.

Figure 15:
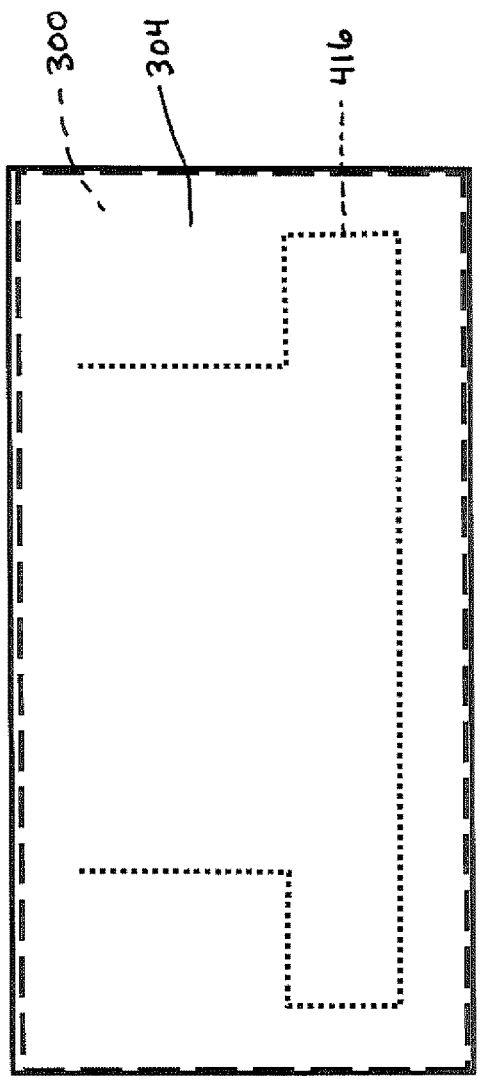
FIG. 15 depicts the sewn fabric layers of FIG. 14 after the fabric layers have been removed from the frame.
Figure 17:
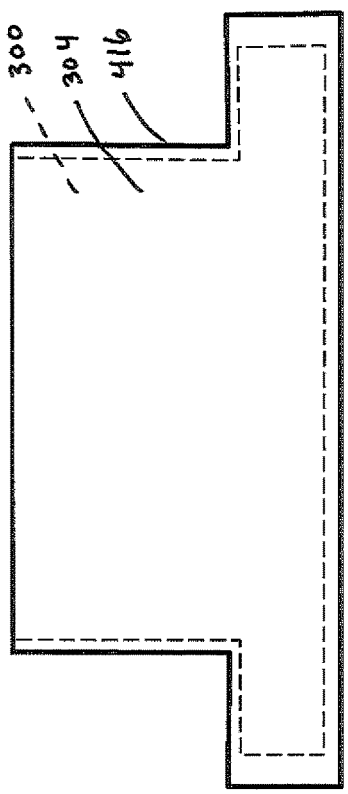
FIG. 17 depicts the sewn and trimmed fabric layers of FIG. 16 after the fabric layers have been inverted.
Figure 16:
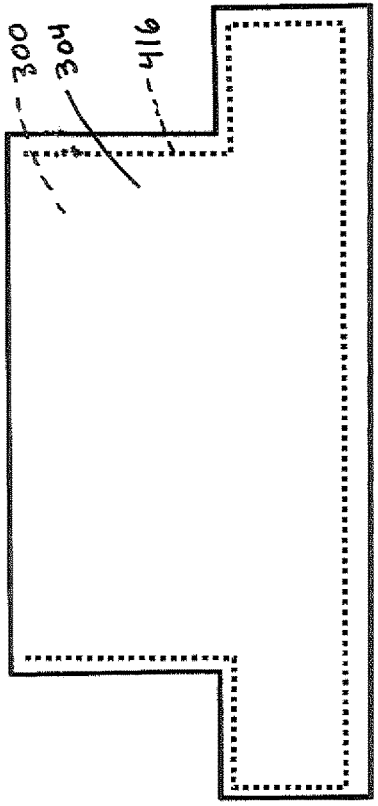
FIG. 16 depicts the sewn fabric layers of FIG. 15 after the fabric layers have been trimmed to remove excess fabric.

As shown in FIG. 15, after the panels of fabric 300, 304 are sewn together, the frame 200 is removed from the sewing machine 404, and the panels of fabric 300, 304 are removed from the frame 200 (block 120 of method 100). Next, as shown in FIG. 16, the panels of fabric 300, 304 are cut around the stitches 416 of the fabric component to remove excess fabric from the finished fabric component. Finally, as shown in FIG. 17, the panels of fabric 300, 304 are inverted over the stitches 416 to provide a smooth, even, finished seam on the perimeter of the fabric component. Accordingly, in FIG. 17, the outward perimeter of the fabric component is indicated with reference numeral 416 to indicate that the stitches 416 provide the perimeter shape of the fabric component. The dashed line shown in FIG. 17 indicates the edges of the first and second panels of fabric 300, 304 that were formed when the excess fabric was cut from panels 300, 304.

Figure 2:
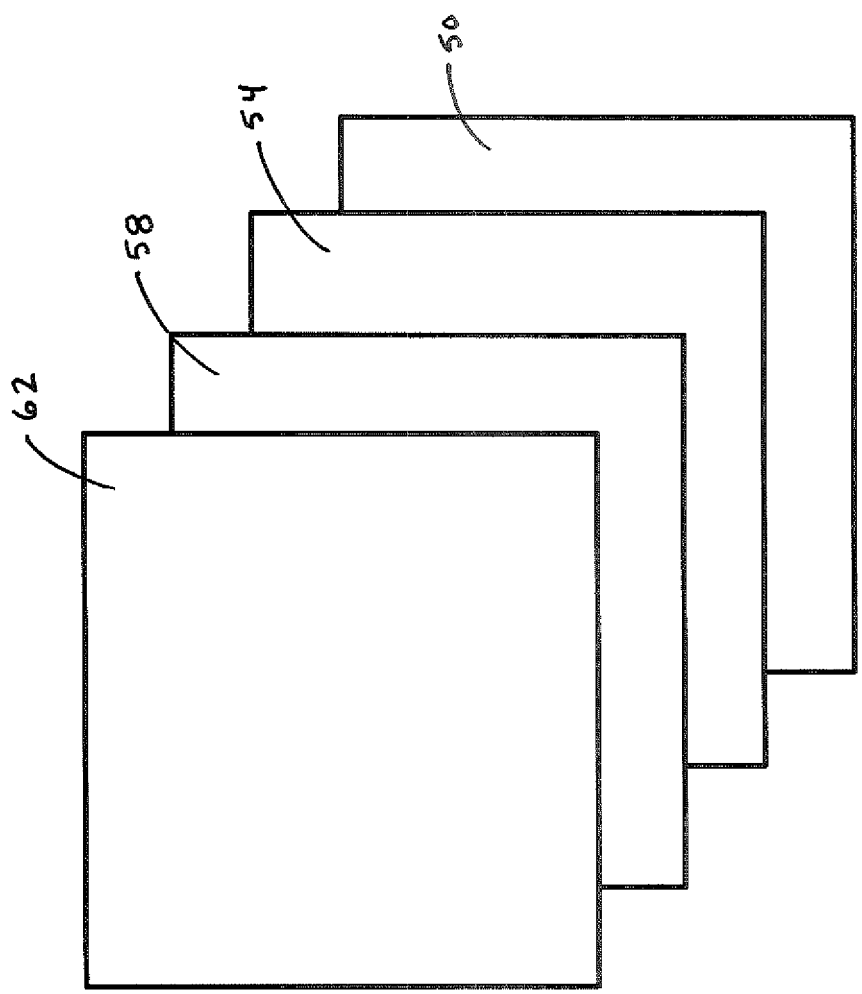
FIG. 2 depicts a known arrangement of layers of fabric for use in the fabric components shown in FIG. 1.

In the embodiment described above, two panels of fabric 300, 304 are sewn together to form the fabric component. However, in alternative embodiments, more than two panels of fabric can be sewn together to form the fabric component. For example, a panel of fabric forming a backing layer 50, a panel of fabric forming a padding layer 54, a panel of fabric forming a blackout layer 58, and a panel of fabric forming a decorative layer 62 (shown in FIG. 2 and described above) can be sewn together using the method 200. In such embodiments, block 104 of method 100 includes arranging all four of the panels of fabric atop one another on the frame 200 such that the lowermost layer forms the first panel of fabric, which is in direct contact with the frame 200, and the uppermost layer forms the second panel of fabric, which is positioned on a side of the first panel of fabric that is opposite to the frame 200. Third and fourth panels of fabric are arranged between the first and second panels of fabric. In one specific example, the backing layer 50 forms the first panel of fabric, the decorative layer 62 forms the second panel of fabric, and the padding layer 54 and the blackout layer 58 form the third and fourth panels of fabric, respectively. Alternatively, the order of these layers can be reversed.

Furthermore, in embodiments where the fabric component includes more than two panels of fabric, some of the panels of fabric arranged between the first panel of fabric and the second panel of fabric at least partially cover the opening 212 of the frame, but may not cover the entire opening 212 of the frame 200. For example, in embodiments where the padding layer 54 forms a third panel of fabric within the fabric component, the padding layer 54 may not need to extend over an entirety of the fabric component. In other words, the entire fabric component may not need to be padded. Accordingly, the panel of fabric formed by the padding layer 54 is arranged and positioned between the first panel of fabric 300 and the second panel of fabric 304 such that at least some portion of the panel of fabric formed by the padding layer 54 will be stitched through when the controller 408 operates the sewing machine 404 to sew the pre-programmed pattern of stitches 416. Thus, in such embodiments, the controller 408 selectively operates the sewing machine 404 to sew the third panel of fabric directly to at least one of the panels of fabric arranged directly adjacent to the third panel of fabric. In one instance, the sewing machine 404 is operated to sew at least one of the first panel of fabric 300 and the second panel of fabric 304 directly to the third panel of fabric. The third panel of fabric may extend onto at least a portion of the recessed ledge 208 of the frame 200 so as to be clamped between at least one clamp 228 and the clamping surface 220. Alternatively, the third panel of fabric may be held in place solely by friction with the panels of fabric between which it is arranged.

The configuration of the frame 200 is specifically advantageous for carrying out the method 100 described above to make fabric casket components. In particular, fabric casket components require relatively large panels of fabric to be sewn together to cover large surface areas of the casket. Such large panels of fabric are not easily fitted and manipulated within known programmable sewing systems. At the same time, fabric casket components require a variety of materials to be sewn together, including very thin and soft materials to form the sides of the fabric casket components that will be visible during use of the casket. Such thin and soft materials are not typically sewn together, especially with thicker or coarser materials, in known programmable sewing systems, because the materials tend to move relative to one another during sewing processes. Additionally, known programmable sewing systems are typically used for thicker and more robust materials than those used for fabric casket components. The recessed ledge 208, the metal plates 244, and the magnets 248 of the frame 200 enable the frame 200 to hold large panels of fabric in place during sewing operations, including large panels of thin and soft materials and panels of a variety of different materials.

Of course, numerous other adaptations are possible. Moreover, there are advantages to individual advancements described herein that may be obtained without incorporating other aspects described above. Therefore, the spirit and scope of the appended claims should not be limited to the description of the preferred embodiments contained herein.

What is claimed is:

1. A method of making a fabric component, comprising:
    arranging at least two panels of fabric on a frame such that one of the at least two panels of fabric forms a first panel in direct contact with the frame and another one of the at least two panels of fabric forms a second panel positioned on a side of the first panel opposite to the frame, and such that the first panel and the second panel cover an opening of the frame and cover a clamping surface of the frame that surrounds a perimeter of the opening;
    rotating at least one clamp about an axis of rotation that is positionally fixed relative to the frame from an open position located above the frame to a closed position located above the first and second panel to hold the first panel and the second panel directly interposed between the at least one clamp and the clamping surface;
    arranging the opening of the frame in an operating area of a programmable sewing machine;
    operating the programmable sewing machine to sew the at least two panels of fabric together within the opening of the frame such that the at least two panels of fabric form the fabric component; and
    removing the fabric component from the frame while the at least one clamp is in the open position.

2. The method of claim 1, wherein:
the clamping surface is formed on a recessed ledge of the frame, and wherein the open position of the at least one clamp is disposed over a portion of the frame from which the ledge is recessed.

3. The method of claim 2, wherein:
the recessed ledge of the frame is arranged concentrically between the opening and a lip of the frame.

4. The method of claim 3, wherein:
the lip of the frame defines a lip surface,
the clamping surface is parallel to the lip surface, and
the clamping surface is not coplanar with the lip surface.

5. The method of claim 1, wherein:
in the closed position, a retaining surface of the at least one clamp is arranged parallel to the clamping surface, and
in the open position, the retaining surface is not arranged parallel to the clamping surface.

6. The method of claim 1, wherein:
the clamping surface includes at least one metal plate, and
the at least one clamp includes at least one magnet corresponding to the at least one metal plate.

7. The method of claim 1, wherein:
operating the programmable sewing machine to sew the at least two panels of fabric together includes operating the programmable sewing machine to sew the first panel directly to the second panel.

8. The method of claim 1, wherein:
arranging the at least two panels of fabric on the frame includes arranging a third panel between the first panel and the second panel.

9. The method of claim 8, wherein:
arranging the at least two panels of fabric on the frame includes arranging the third panel to at least partially cover the opening of the frame.

10. The method of claim 8, wherein:
operating the programmable sewing machine to sew the at least two panels of fabric together includes operating the programmable sewing machine to sew at least one of the first panel and the second panel directly to the third panel.

11. The method of claim 1, wherein:
operating the programmable sewing machine to sew the at least two panels of fabric together includes operating the programmable sewing machine to move the frame relative to a needle of the programmable sewing machine.

12. The method of claim 1, wherein:
the clamping surface is formed on a recessed ledge of the frame, the clamping surface includes a non-metal portion.

13. A method of making a fabric component, comprising:
operating selectively with a controller a programmable sewing machine to: move a frame relative to a sewing needle such that at least two panels of fabric covering an opening of the frame are arranged in an operating area of the sewing needle; and guide the sewing needle in the operating area through the at least two panels of fabric to form the fabric component, wherein:
a first panel of the at least two panels is arranged in direct contact with the frame and a second panel of the at least two panels is arranged on a side of the first panel opposite to the frame, and the first panel and the second panel cover a clamping surface of the frame surrounding a perimeter of the opening, and
at least one clamp rotates about an axis of rotation that is positionally fixed relative to the frame and is located above an uppermost surface of the frame, the at least one clamp rotating from an open position to a closed position to hold the at least two panels of fabric directly interposed between the at least one clamp and the clamping surface while the programmable sewing machine guides the sewing needle through the at least two panels of fabric.

14. The method of claim 13, wherein:
the clamping surface is formed on a recessed ledge of the frame.

15. The method of claim 14, wherein:
the recessed ledge of the frame is arranged concentrically between the opening and a lip of the frame.

16. The method of claim 15, wherein:
the lip of the frame defines a lip surface,
the clamping surface is parallel to the lip surface, and
the clamping surface is not coplanar with the lip surface.

17. The method of claim 13, wherein:
the clamping surface includes at least one metal plate, and
the at least one clamp includes at least one magnet corresponding to the at least one metal plate.

18. A method of making a fabric component, comprising:
arranging at least two panels of fabric on a frame such that one of the at least two panels of fabric forms a first panel in direct contact with the frame and another one of the at least two panels of fabric forms a second panel positioned on a side of the first panel opposite to the frame, and such that the first panel and the second panel cover an opening of the frame and cover a clamping surface of the frame that surrounds a perimeter of the opening;
rotating at least one clamp about an axis of rotation that is positionally fixed relative to the frame from an open position to a closed position to hold the first panel and the second panel directly interposed between the at least one clamp and the clamping surface;
arranging the opening of the frame in an operating area of a programmable sewing machine;
operating the programmable sewing machine to sew the at least two panels of fabric together within the opening of the frame such that the at least two panels of fabric form the fabric component; and
removing the fabric component from the frame; and
wherein,
the clamping surface includes at least one metal plate, and
the at least one clamp includes at least one magnet corresponding to the at least one metal plate.

19. The method of claim 18, wherein rotating the at least one clamp further comprises rotating the at least one clamp from the open position located above a portion of the frame to the closed position located above another portion of the frame.

* * * * *